United States Patent [19]

Yahara

[11] 4,027,564
[45] June 7, 1977

[54] MACHINE FOR CUTTING A MOVING STRIP OF MATERIAL

[75] Inventor: Satoshi Yahara, Daito, Japan

[73] Assignee: Kabushiki Kaisha Token Kikai Seisakusho, Daito, Japan

[22] Filed: June 23, 1976

[21] Appl. No.: 699,052

[52] U.S. Cl. .................................................. 83/328
[51] Int. Cl.² ........................................ B23D 25/02
[58] Field of Search .............................. 83/328, 327

[56] References Cited

UNITED STATES PATENTS 3,288,013  11/1966  Cochrane ............................ 83/328

Primary Examiner—J. M. Meister
Attorney, Agent, or Firm—Wenderoth, Lind & Ponack

[57] ABSTRACT

A machine for cutting a moving strip of material by means of a pair of cutting blades carried by their respective blade holders. The latter each are supported by a pair of eccentric shafts at their opposite ends for circular movement and are guided by two same guide bars for vertical slidal movement to ensure that the cutting blades are put into cutting engagement with the material at the same time and at the same cutting angle.

2 Claims, 4 Drawing Figures

MACHINE FOR CUTTING A MOVING STRIP OF MATERIAL

The present invention relates to a machine for cutting a continuously moving strip of material, e.g. band steel, into regular lengths.

An object of the present invention is to provide a machine adapted to cut a moving strip material into regular sizes with accuracy and without the necessity of stopping the flow of material.

Another object of the present invention is to provide a machine of such character which is compact in size and performs efficient cutting with minimum power requirement.

The present invention consists in a cutting machine including an opposed pair of cutting blades carried by their respective blade holders each supported by eccentric shafts at their ends of impart a substantially circular motion to the cutting blades, said blade holders being guided by two vertical guide bars slidably fitting in vertical through holes formed in the blade holders in alignment with the eccentric shafts to ensure precisely symmetrical motion of the cutting blades. dr Other objects and advantages of the present invention will become apparent from the following description taken in connection with the accompanying drawings, wherein:

Figure 1:
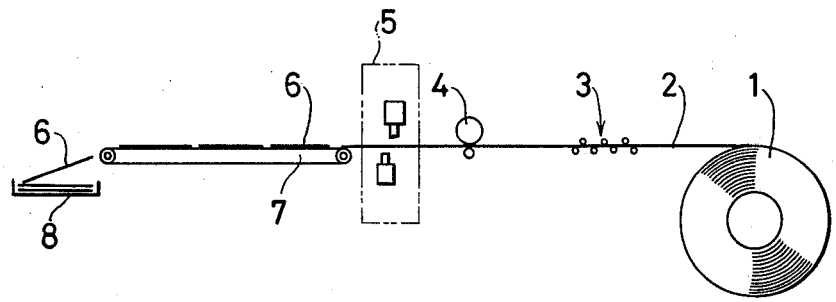
FIG. 1 is an illustration showing an example of installation in which the cutting machine according to the present invention is used.

Referring to FIG. 1, a strip of material 2 wound around an uncoiler 1 is first passed through uncurler rolls 3 to uncurl it into a substantially flat shape. It is then passed through measuring rolls 4 to detect the length for which the material has been fed since the last cut and the speed at which it is being fed. When the detected length approaches the preset cutting length, a controller directly coupled to the measuring rolls 4 actuates a motor for a cutting machine 5 to cut the material at the correct cutting point while it is running. The sheets of material 6 thus made are transferred on a conveyor 7 and are stacked on a receiving bin 8.

Figure 4:
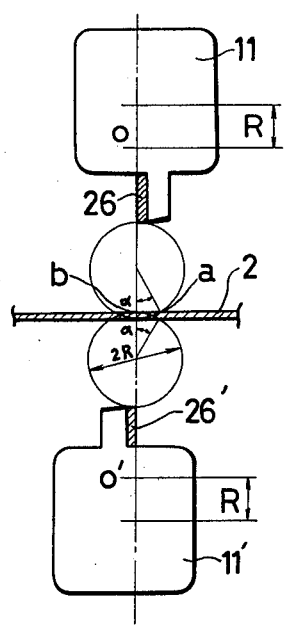
FIG. 4 is an illustration showing circular motion imparted to the cutting blades.
Figure 3:
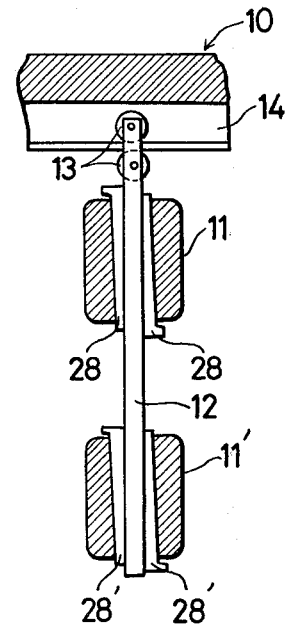
FIG. 3 is a sectional view taken along the line III—III of FIG. 2.
Figure 2:
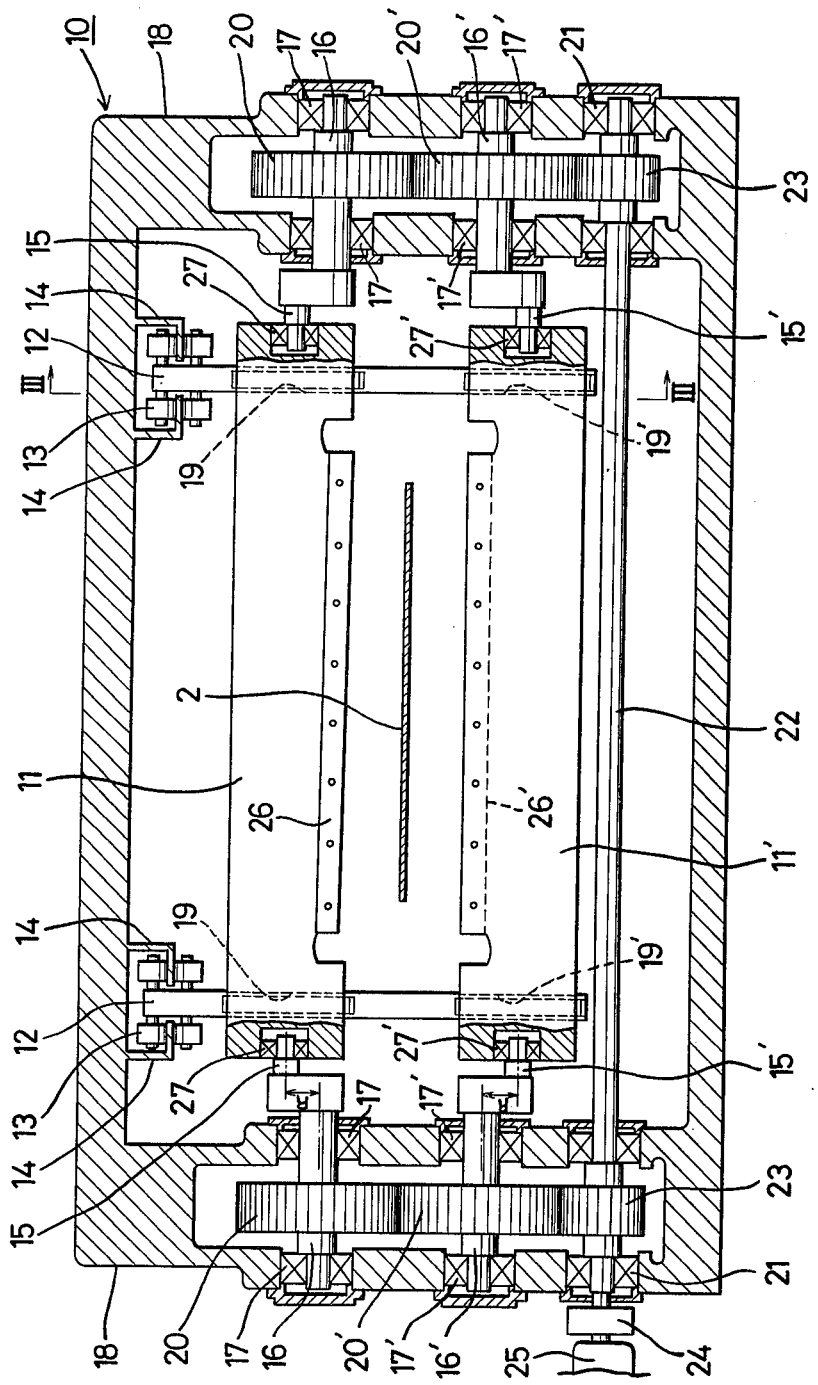
FIG. 2 is a longitudinal sectional view of the cutting machine according to the present invention.

The cutting machine 5, illustrated in FIGS. 2–4, includes a frame generally indicated by 10 and constructed so as for the material from the uncurler rolls 3 to pass through the center thereof.

The frame 10 has vertical side walls 18 formed to be hollow to serve as a gear box. Through the hollow side walls 18 extend two opposed pairs of lateral shafts 16 and 16' disposed one above the other and journaled in a pair of bearings 17 and 17', respectively. Gears 20 and 20' are mounted on the shafts 16 and 16', respectively, said gears being in engagement with each other.

One elongate transmission shaft 22 laterally extends entirely through the frame 10 at the bottom thereof and is journaled in a pair of bearings 21 in each side wall 18. A gear 23 is mounted on the shaft 22 at each thereof in engagement with the gear 20' on the lower shaft 16'. The shaft 22 is coupled to a driving means 25 at one end thereof through a shaft coupling 24.

The shafts 16 and 16' have their inner ends projecting beyond the inner surface of the side wall 18. Cutting blade holders 11 and 11' are horizontally supported one above the other through the bearings 27 and 27' by eccentric shafts 15 and 15', respectively, which in turn are eccentrically coupled to the inner projecting ends of shafts 16 and 16', respectively, with an eccentricity of R.

Rotation of the transmission shaft 22 is transmitted through the gears 23 to the gears 20' and 20 and thus the shafts 16 and 16' so that the eccentric shafts 15 and 15' and thus the cutting blade holders 11 and 11' are made to rotate at the same time but in opposite directions.

A cutting blade 26 is fixedly mounted on the lower edge of the upper blade holder 11 to permit adjustment of the cutting angle. Another cutting blade 26' is similarly mounted on the upper edge of the lower blade holder 11' so as to be opposed to the upper blade 26.

To the top wall of the frame 10 are secured two opposed pairs of longitudinal rails 14 of L-shaped section disposed to be parallel to each other and suitably spaced from each other. A vertical guide bar 12 of rectangular cross section is suspended from each pair of rails 14 therebeteen. To the upper end of each guide bar 12 are secured two shafts on each end of which a roller 13 is rotatably mounted. The rollers 13 on the upper and lower shafts roll on the upper and lower surfaces of the horizontal section of the rails 14, respectively, to allow movement of each guide bar 12 along the rails.

Vertical through holes 19 and 19' are formed in both blades holders 11 and 11', respectively, at each end thereof in vertical alignment with each other and in horizontal alignment with the eccentric shafts. Each of the guide bars 12 fits in these through holes so as to permit free vertical movement of the blade holders 11 and 11'. This arrangement ensures that the cutting blades 26, 26' are kept in positions symmetrical to each other relative to the material to be cut as in FIG. 4. Thus, they come into cutting engagement with the upper and lower sides of the material at the same time.

Since the eccentric shafts 15 and 15' have their axes eccentric from the axis of shafts 16 and 16', respectively, for a length R, they impart the blade holders 11 and 11 ' and thus the blades 26 and 26', respectively, a circular motion with a radius of R as the shafts 16 and 16' are driven through the gear train.

Since the blade holders 11 and 11' are guided by the two same guide bars 12, 12, they always assume positions symmetrical to each other relative to the strip material. The guide bars 12 run along the longitudinal rails 14 for the maximum length equal to 2R, keeping the cutting blades 26, 26' in a vertical position (FIG. 4).

Thus, the blades 26, 26' do one circular motion for each cutting cycle. They simultaneously come into cutting engagement with the material 2 at the position $a$ which is by a cutting angle of $\alpha$ away from the perpendicular line connecting the origins of eccentricity O and O' in a direction opposite to that of movement of the material. They complete cutting at a point $b$ on the perpendicular line where they meet each other.

With a fixed cutting angle, $\alpha$, the speed at which the blades 26 and 26' rotate has to be synchronized with the speed at which the material is being fed, of course. To this end, the driving means 25 is provided with a speed change means (not shown) to ensure that the eccentric shafts 15 and 15' are driven at such a synchronized speed for every cutting cycle.

A pair of wedges 28 and 28', are adjustably mounted in each of the vertical through holes 19 and 19', one from top and theother from bottom of each hole (FIG. 3). By sliding them into or away from the holes, the cutting blades 26 and 26' can be adjusted so as to be exactly parallel to each other and to have their edges meeting each other properly at the instant of cutting.

One turn of the upper and lower eccentric shafts 15 and 15' completes one cutting cycle. After cutting, the upper and lower blades are returned to their original uppermost and lowermost positions, respectively, to wait until the measuring rolls 4 detect the next cutting point. The upper and lower blades are kept in symmetrical positions to each other with respect to the strip material in any phase of their circular motion.

This arrangement ensures precise and continuous cutting of the material into predetermined lengths. The use of eccentric shafts and guide bars for driving and guiding the blade holders, respectively, assures smooth, accurate cutting without any undue stree on the material. If the cutting angle is properly set, the material being cut cannot be displaced sideways by the cutting blades so as to be cut obliquely, not perpendicular to the longitudinal axis of the material.

while a preferred embodiment has been described, variations thereto will occur to those skilled in the art within the scope of the present invention.

I claim:

1. A machine for cutting a moving strip of material into regular sizes by intermittently rotating two cutting blades at a speed synchronized with the speed at which the material to be cut is being fed, said machine comprising: a frame constructed for the material to be cut to pass through the center thereof,
   two opposed pairs of driving shafts laterally mounted through the side walls of said frame, one pair above the other,
   two opposed pairs of eccentric shafts eccentrically coupled to said driving shafts,
   an opposed pair of cutting blade holders each laterally supported by said pair of eccentric shafts at the opposite ends thereof so as to impart a substantially circular motion to said cutting blades as said driving shafts rotate,
   an opposed pair of cutting blades each fixedly mounted on said cutting blade holders with their cutting edges facing each other,
   means for driving said two pairs of driving shafts at the same time but in opposite directions, and
   a pair of vertical guide suspended from the top wall of said frame for longitudinal movement and loosely fitted in two vertical through holes formed in said cutting blade holders in alignment with said eccentric shafts, whereby putting said cutting blades into cutting engagement with the material at the same time and at the same cutting angle.

2. A machine as claimed in claim 1 wherein said pair of vertical guide bars each are suspended from a pair of rails secured to the top wall of said frame for longitudinal movement along said rails.

* * * * *